No. 643,199. Patented Feb. 13, 1900.
E. N. PORTER & J. BARNES.
CAR FENDER.
(Application filed Apr. 13, 1899.)
(No Model.) 2 Sheets—Sheet 1.

Witnesses:
Sena Blanche Dougherty.
Hannah Marie Kennedy.

Inventors
Edward N. Porter and
Jenius Barnes
By their attorney George W. Kennedy No. 643,199. Patented Feb. 13, 1900.
E. N. PORTER & J. BARNES.
CAR FENDER.
(Application filed Apr. 13, 1899.)
(No Model.) 2 Sheets—Sheet 2.
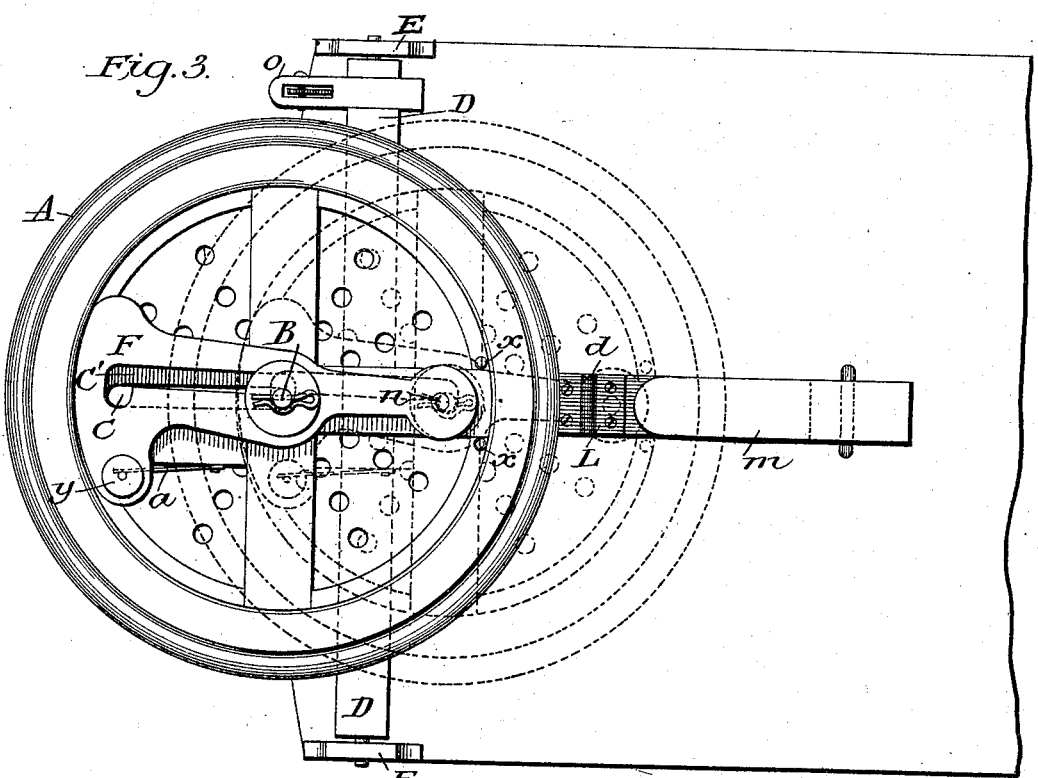
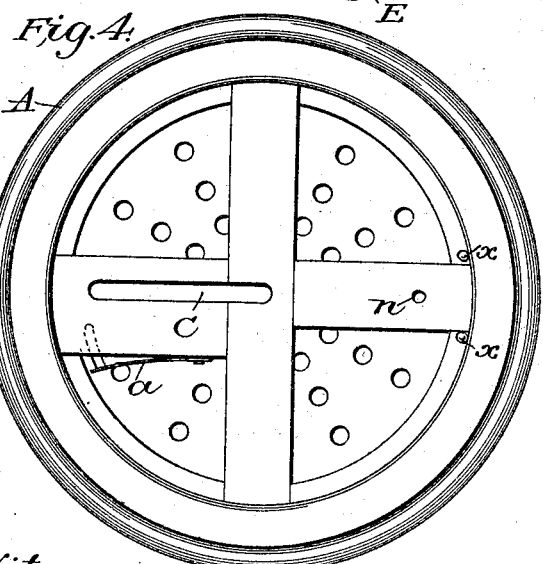
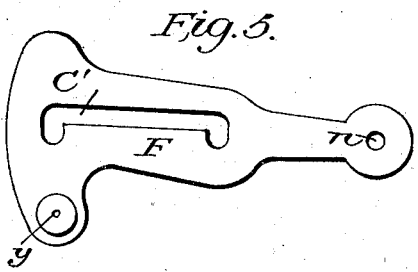
Witnesses:
Lena Blanche Dougherty.
Hannah Marie Kennedy.
Inventors
Edward N. Porter and
Junius Barnes
By their Attorney
George F. Kennedy

UNITED STATES PATENT OFFICE.

EDWARD N. PORTER AND JUNIUS BARNES, OF BURLINGTON, VERMONT.

CAR-FENDER.

SPECIFICATION forming part of Letters Patent No. 643,199, dated February 13, 1900.

Application filed April 13, 1899. Serial No. 712,953. (No model.)

*To all whom it may concern:*

Be it known that we, EDWARD N. PORTER and JUNIUS BARNES, citizens of the United States, residing in Burlington, in the county of Chittenden and State of Vermont, have invented a new and useful Car-Fender, of which the following is a specification.

Our invention relates to a wheel or wheels fastened to a frame that holds them in a horizontal position and provided with pneumatic rubber tires placed in front of a car near the rails, so that any person or object upon the track will be removed without injury. We attain these objects by the mechanism illustrated in the accompanying drawings, in which—

Figure 1:
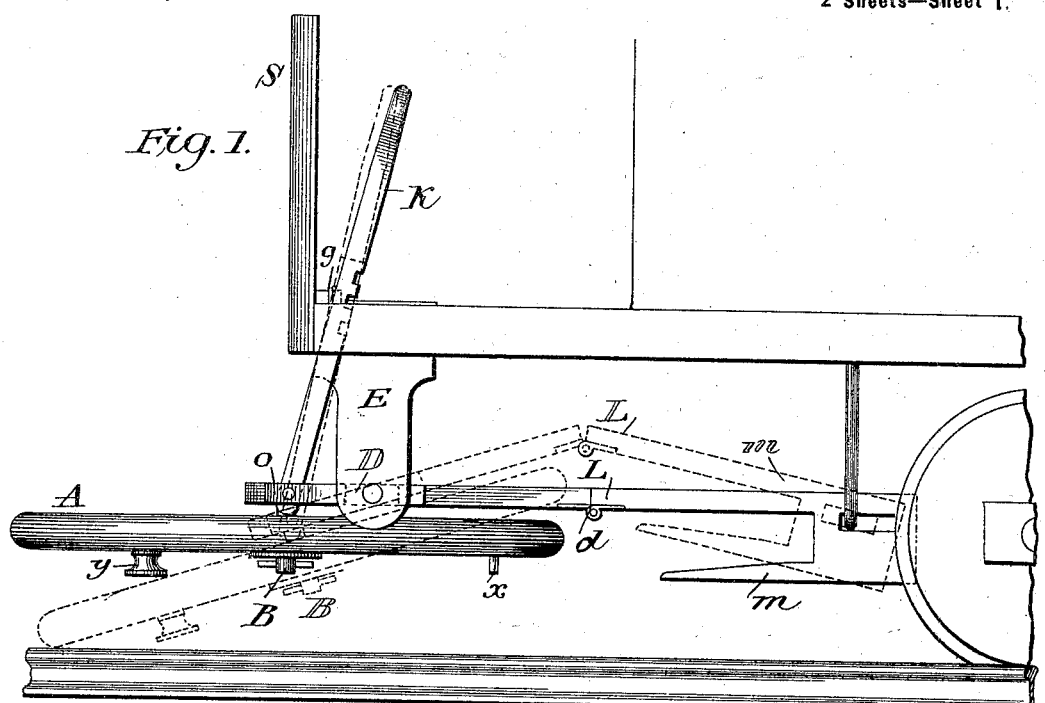
Figure 2:
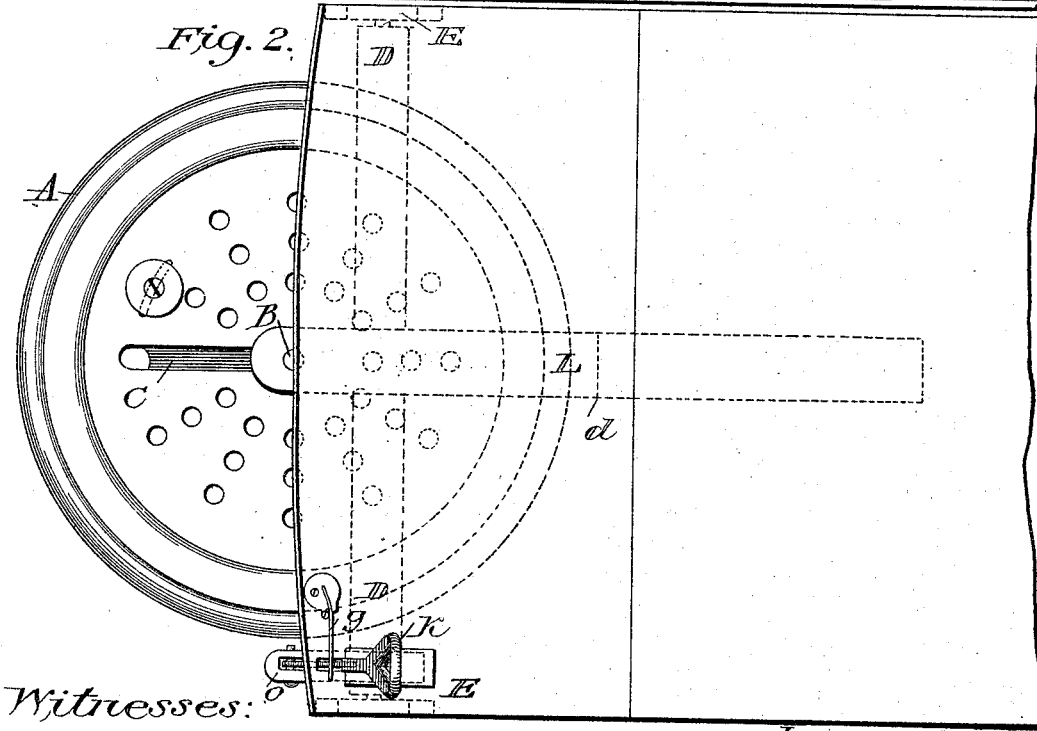

Figure 1 is a side view of the end of a car with the fender attached both in operative and in an inoperative position. Fig. 2 is a top view of the fender attached to the car. Fig. 3 is a bottom view of the fender attached to the car both in operative and inoperative position. Fig. 4 is a bottom view of the fender alone. Fig. 5 is a plan view of the latch.

Similar letters refer to similar parts throughout the several views.

A represents a fender made with one wheel, which has a diameter a little larger than the width of the car-track, and when lowered for use the front extends to the top of the rails. This wheel revolves upon the pin B, that secures it to the end of the draw-bar L, which is firmly framed to the cross-bar D. This draw-bar is also used to draw the car when two cars are attached together. The cross-bar D is fitted at each end to a round hole in the brackets E E, that are fastened to the car at each side. The draw-bar is also fastened or held up at the other end by an iron rod or bracket secured to the bottom of the car, and it is hung upon the rod or bracket in such a way as to move upon the joint $d$ up and down a little when the wheel A is raised or lowered by means of cross-bar D, attached to the lever K.

In order to move the wheel A back out of the way when two cars are to be fastened together or when not in use, there is provided the slot C, extending from the center to a point near the outer edge of the wheels. This slot is of the same width as the diameter of the pin B, and the wheel is held at either end of the slot C by the latch F, which is provided with the slot C', that is the same length and the same width as the slot C. The slot C' is bent at each end, so that when the wheel A is pushed back out of the way the bent end of the slot C' holds against the pin B like a shoulder, the latch F being pressed against the pin by the spring $a$. When pulled forward, the pin B is held in the same way at the other end of the slot C', as shown in Fig. 3. The latch F is fastened on the under side of the wheel at $n$ and also to the pin B by means of a washer and a nut, so as to move a little back and forth over the slot C when in use, and is fastened at the other end by a pin attached to the ring $y$, which works in a little slot that is long enough to allow the latch to move back and forth over the slot C. The draw-bar is provided with a cleat $m$, upon which the back part of the wheel A rests when it is pushed upon the same out of the way, and the cleat $m$ is just wide enough to fit between the pins $x$ $x$, that serve as guides when the wheel slides back and holds it firmly in place. Fig. 3 shows the wheel-fender pushed back, so that the cleat $m$ comes between the pins $x$ $x$ and the pin B is at the front end of the slots C' and C. The arm $o$ is mortised into the end of the cross-bar D and is just long enough to work the cross-bar on its bearings in the brackets E E to lower or raise the wheel by means of the lever K. This rocking lever K is fastened to the arm $o$, as appears in Fig. 6, and comes up through the platform of the car, where it is easily handled by the motorman, as is shown by Fig. 1. The lever K is provided with notches that engage upon the edge of an iron plate fastened to the floor of the car-platform on the edge of an aperture for the same and is held against the plate by an ordinary spring $g$ and moved up and down to raise or lower the front of the wheel A when in use.

S is a screen on the front of the car.

The wheel A may be made of any suitable material—wood or metal—and the upper side covered with perforated chair-seating or some flexible material, and the wheel is provided with a pneumatic rubber tire, which may be like an ordinary bicycle-tire or be corrugated or have knobs or cogs to engage with greater friction with any person or object caught upon the track. It will be readily seen that the wheel A, coming in contact with any person or object, would turn one way or the other and with the friction of the rubber tire would have a tendency to move the same off from the track to one side or on the upper side of the wheel-fender.

What we claim as our invention, and desire to secure by Letters Patent, is—

1. The wheel A provided with a pneumatic or rubber tire having knobs or cogs to engage any obstruction upon the track with greater friction and a covering of perforated chair-seating or other flexible material in combination with the draw-bar L provided with the pin B upon which the wheel revolves, and the cross-bar D fastened to the end of the car by the cleats E E as herein described and set forth.

2. The combination of the wheel fastened to the end of a car, vehicle, or engine and provided with a tire of flexible material and with flexible material upon the top of the same, with the screen S, the pin B upon which it revolves and the draw-bar L, and the cross-bar D by which it is held to the car and tilted up and down as herein described and set forth.

3. The combination of the wheel A provided with the slot C, the latch F provided with the slot C' and the spring $a$ for sliding the wheel back under the car as herein set forth.

4. The combination of the draw-bar L provided with the hinge $d$, the cross-bar D provided with the arm $o$, the lever K provided with the notches to engage the iron plate in the car-platform held in place by the spring $g$, and the wheel A substantially as described.

5. The wheel A provided with pins $x\ x$ in combination with the cleat $m$ to guide the wheel A and hold it firmly in its back-and-forth movement, substantially as described.

EDWARD N. PORTER.
JUNIUS BARNES.

Witnesses:
O. P. RAY,
P. O. RAY.